R. E. KLAGES.
DRAG LINK.
APPLICATION FILED APR. 19, 1920.
1,384,261.
Patented July 12, 1921.
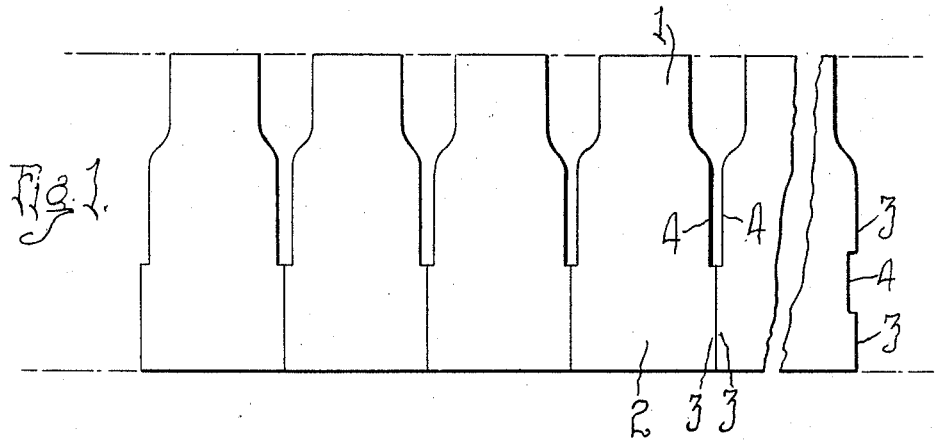
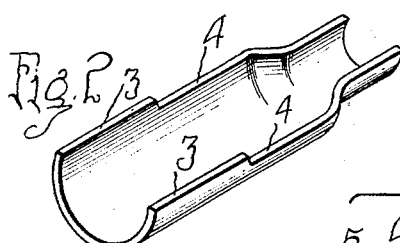
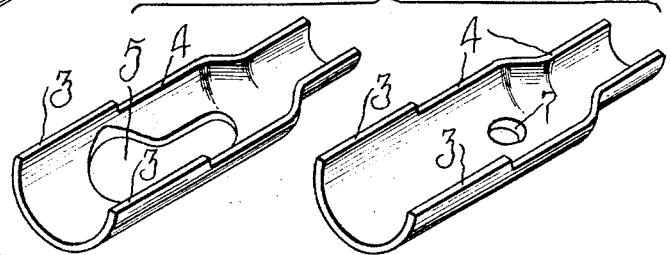
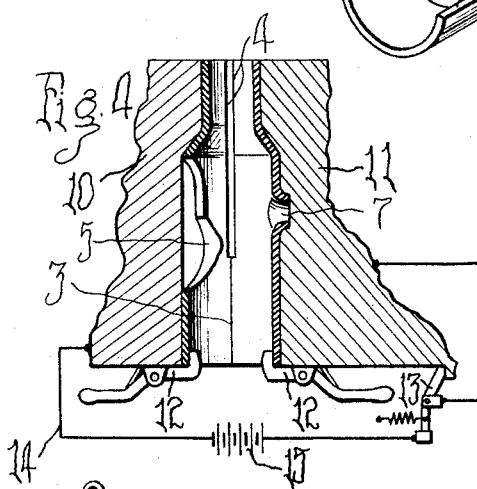
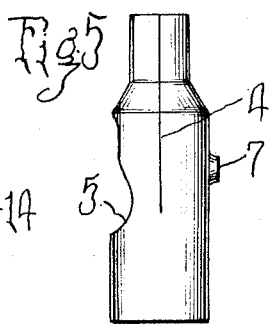
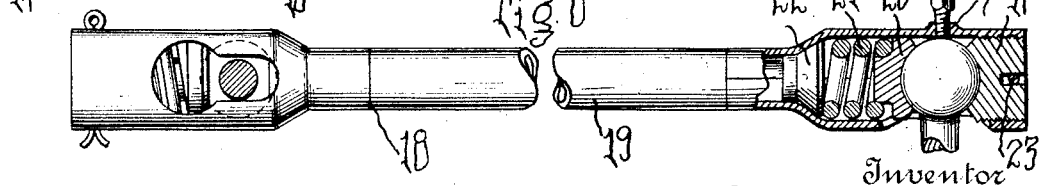
Inventor
Reynold E. Klages
By Attorneys
Blackmore, Spencer & Flint.

UNITED STATES PATENT OFFICE.

REYNOLD E. KLAGES, OF COLUMBUS, OHIO.

DRAG-LINK.

1,384,261.  Specification of Letters Patent.  Patented July 12, 1921.

Application filed April 19, 1920. Serial No. 375,067.

*To all whom it may concern:*

Be it known that I, REYNOLD E. KLAGES, a citizen of the United States, and a resident of Columbus, county of Franklin, and State of Ohio, have invented certain new and useful Improvements in Drag-Links, of which the following is a full, clear, concise, and exact description, such as will enable others skilled in the art to which the invention relates to make and use the same, reference being made therein to the accompanying drawings, which form a part of this specification.

The present invention has reference particularly to drag-links or steering rods for motor vehicles although it is applicable to other hollow compression or tension elements, as will be understood later.

It has been customary heretofore to form drag-links of three sections of tubing—two end or socket sections and an intermediate section butt-welded to the socket sections. This construction, while possessing the desired strength for a given weight of metal, has, however, proven expensive, due largely to the use of tubing (which requires to be drawn) for the socket sections; the primary purposes of the present invention are therefore to avoid the objections inherent to the use of tubing in the sockets, and to obtain substantially the same strength for a given weight of material, by methods more nearly in accordance with commercial demands.

To this end it consists in a link or the like wherein the hollow end or socket sections are each formed from a pair of stamped or pressed sheet metal halves welded together longitudinally to form the socket which is thereafter welded to the intermediate section, the latter being of tubing. By forming the sockets each in two sections as stated, I am enabled to shape the halves readily in a press and to weld them together by electrical methods, although it will be evident that an acetylene or other blow-pipe might be used instead; however, the electric welding is much to be preferred both on account of the large out-put which can thus be secured and because of the fact that the metal at the seams is less hardened than when welded by blow-pipe methods, thereby more readily permitting the threading necessary to receive the end bearing blocks or plugs. That is, the invention is concerned not only with the article itself but with the method by which it is manufactured, as will be more fully pointed out and claimed.

In the drawings:

Figure 1 is a plan view showing throughout the part thereof up to the break near the right hand end of the figure the preferred manner of cutting the sheet metal blank from which the sockets are made, and also showing at the extreme right hand end thereof a modified form.

Fig. 2 is a perspective view showing one of the socket-halves after the bending or forming operation.

Fig. 3 is a similar view showing two complementary socket-sections respectively punched to receive the associated ball-head of a steering arm or the like and the threaded stem of a grease cup.

Fig. 4 is a diagrammatic section showing two complementary socket sections in an electric welder the jaws of which have just brought the flashings on the sections into contact to complete the welding circuit.

Fig. 5 shows the socket after the welding operation, and

Fig. 6 is a view, partly in section, showing the completed drag-link.

From Fig. 1 it will be seen that the first operation consists in cutting a flat sheet of metal to form the relatively narrow portions 1 and the relatively wide portions 2, the latter of which are provided throughout a part of their side edges with flashings 3 which are to be fused or burned away to form the weld; in the preferred construction, these flashings are entirely adjacent the larger ends of the sections but it will be evident that they may assume other forms and in some cases be non-continuous as indicated at the extreme right side of Fig. 1. In any event there is preferably formed, adjacent the flashings, certain edge faces 4 the purpose of which will be set forth later. The blanks are then subjected in proper dies (not shown) to a bending or forming operation whereby they are shaped in trough or semi-bottle form, as shown in Fig. 2. It will be noted that the two sections which go to make up a given socket are, or may be, up to this point duplicates. Each section is next subjected to a piercing operation by any suitable dies or tools, in the one case to form an opening 5 for the ball-arm, Fig. 6, and in the other to provide an outwardly extending perforated boss 7 which is later threaded to receive a grease cup 8. The boss and cup may in some instances be omitted, as is obvious, and the shape of the opening 5 is subject to considerable variation. Since these operations will be easily understood, the corresponding dies have in each instance been omitted from the drawing. It will be understood also that the sections shown in Figs. 2 and 3 are semi-circular in cross-section except that the flashings 3 project beyond the central longitudinal diametral plane of the corresponding surface of revolution.

10 and 11 represent diagrammatically the dies of a welding machine wherein complementary half-sections of a socket are received and held in any suitable manner as, for example, by spring pressed clamping dogs 12, (conventionally shown) it being understood that either one or both of these dies is movable toward or from the other as is usual in such machines. Also some means, such as the switch 13, preferably of the quick break type, is provided, as is ordinarily the case with welding machines, whereby the welding circuit 14, which receives its current from a battery or other source 15, is automatically broken when the dies have approached to a given short distance apart, that is, when the metal of the flashings has been sufficiently fused. In practice the parts are preferably so proportioned that after the flashings are heated to welding temperature, the circuit is thus automatically broken just before the remaining (unheated) edge faces 4 come into contact; and the operator who handles the lever whereby the closing movement of the welding die or dies is controlled will thereafter "feel" the engagement of the limit or stop surfaces 4 one with the other and interrupt the movement accordingly, thus permitting the flashings to properly set or fuse together to form the desired weld. This operation is both rapid and accurate, inasmuch as the circular cross-sectional configuration of the socket is insured without special care on the part of the operator, and it is thus possible to provide for a full and complete thread for the bearing block or plug 17.

The finished socket is shown in Fig. 5 from which it will be seen that the faces 4 are in close engagement throughout. As indicated in Fig. 6, the link is completed by butt-welding the sockets along the lines 18 to an intermediate section 19 of tubing. The bearing blocks 20, springs 21, spring seats 22, cotters 23 and other parts are of well known construction as will be readily understood.

Inasmuch as it is customary for the sockets to be made by one concern and the other operations in connection with the production of the finished link to be performed elsewhere it will be obvious that my invention resides in the socket as an article of manufacture and sale as well as in the complete link.

I claim:—

1. A drag-link or the like comprising hollow end sections having reduced inner ends and a tubular intermediate section to which said reduced ends are welded, said end portions being each formed from a pair of semi-bottle shaped parts welded together longitudinally.

2. A drag-link or the like comprising hollow bottle-shaped socket sections and a tubular intermediate section to which the smaller ends of said socket sections are secured, said socket sections each being formed of a plurality of pressed sheet metal trough-like elements welded together along their meeting edges.

3. A drag-link or the like comprising hollow bottle-shaped socket sections and a tubular intermediate section to which the smaller ends of the socket sections are butt-welded, said socket sections each being formed of two trough-like halves welded together along a part of their corresponding edges and substantially in direct bearing contact with one another along the rest of said edges.

4. That improvement in the art of manufacturing a hollow drag-link or the like comprising an intermediate tubular section and two sockets, each having a reduced end welded to a corresponding end of the intermediate section, which consists in first forming each of the sockets in a plurality of trough-like elements, and thereafter welding said elements together along their edges and finally welding the sockets to the intermediate section.

5. The method of manufacturing hollow sheet metal articles from sheet metal which consists in first shaping the metal to form troughs having flashings over a part of the lengths of the edges thereof and also having depressed portions, and thereafter electrically welding said troughs together by fusing said flashings and simultaneously causing relative movement of said troughs to bring the depressed edge portions into abutting engagement without causing fusion.

6. The method of manufacturing hollow metal drag-links for vehicles which consists in shaping sheet metal to form troughs each consisting of one half of a socket and one of which is pierced to receive a steering arm, thereafter uniting said troughs in pairs along their edges to form bottle shaped sockets, and butt-welding the reduced ends of said sockets to the corresponding ends of a tube.

In testimony whereof I affix my signature.

REYNOLD E. KLAGES.